Patented July 10, 1951

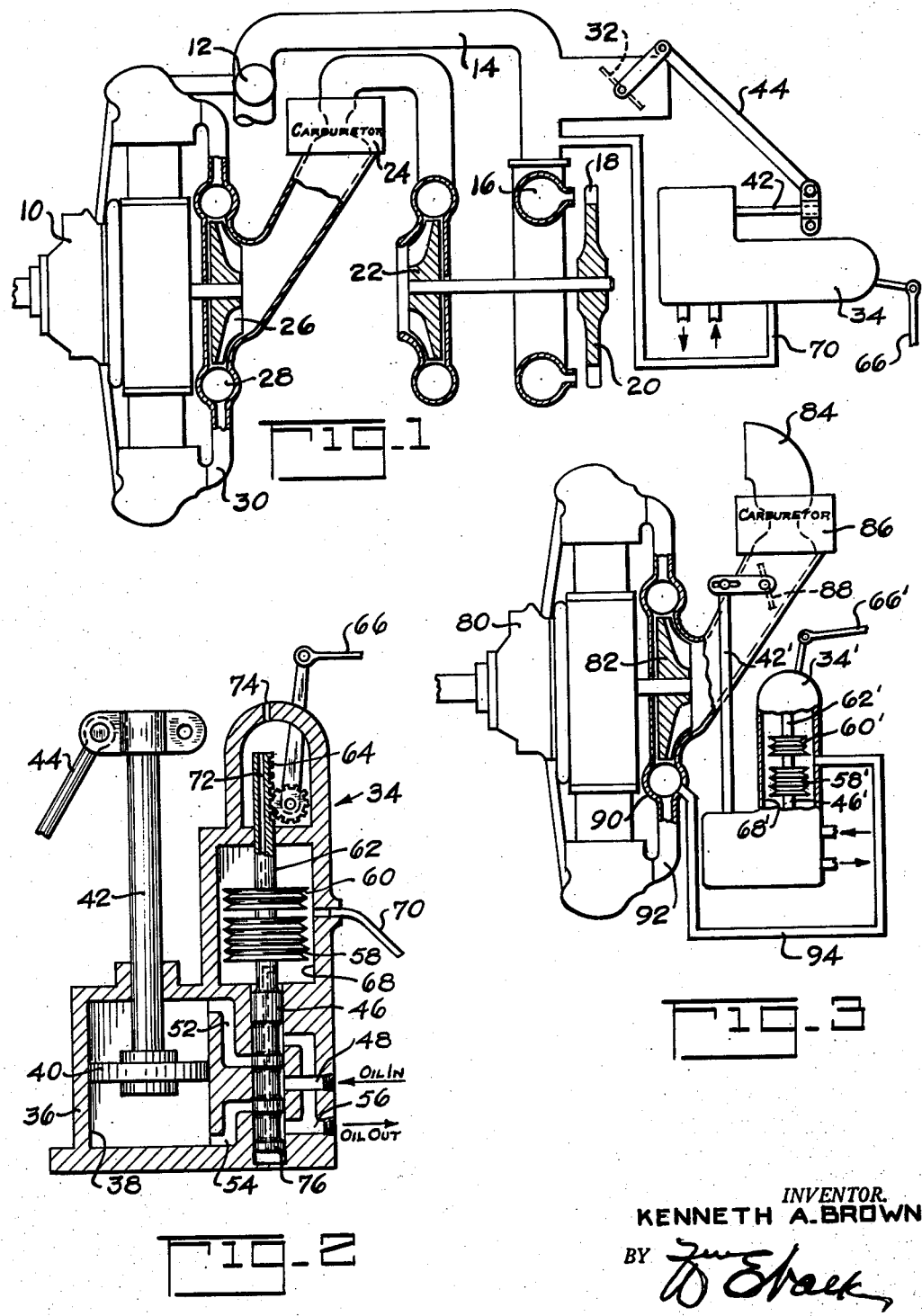

2,560,210

UNITED STATES PATENT OFFICE 2,560,210

ENGINE PRESSURE CONTROL MECHANISM HAVING HOUSING CONTAINING AN EVACUATED BELLOWS AND A VENTED BELLOWS

Kenneth A. Browne, Ridgewood, N. J., assignor to Wright Aeronautical Corporation, a corporation of New York Original application April 9, 1941, Serial No. 387,636, now Patent No. 2,359,615, October 3, 1944. Divided and this application September 7, 1944, Serial No. 553,091

11 Claims. (Cl. 60—13)

This invention is a division of co-pending application Serial No. 387,636, now Patent No. 2,359,615, filed April 9, 1941, in my name and Erold F. Pierce as joint applicants, and relates to internal combustion engines for aircraft, and more particularly to means for controlling the engine power.

In an aircraft internal combustion engine installation including a turbo-supercharger, it is conventional practice to control the supercharger output and therefore, the engine power, by controlling the quantity of engine exhaust gases delivered to the turbine. A waste gate is conventionally provided in the engine exhaust conduit for controlling the engine exhaust gas input to the turbine. In such an installation an increasing supercharger power input is required to maintain a given supercharger output pressure with increasing altitude because of the accompanying decrease in air density, and in addition, the power output of the turbine increases with increasing altitude because of the accompanying increasing pressure differential across the turbine. However, the turbine power output increases with increasing altitude at a faster rate than the power required by the turbine driven supercharger for maintaining a substantially constant supercharger delivery pressure. Therefore, if the exhaust waste gate were controlled to maintain a constant engine exhaust back pressure, the supercharger output pressure would increase with increasing altitude, whereas if the waste gate were controlled to maintain a constant pressure differential across the turbine, the supercharger output pressure would decrease with increasing altitude. Accordingly, it is an object of this invention to provide improved regulator means for controlling the quantity of exhaust gases delivered to the turbine in order to automatically maintain a constant supercharger output pressure independently of variations in the local atmospheric pressure. Specifically, the invention comprises a pair of serially connected bellows, the one responsive to the pressure differential between the engine exhaust back pressure and the local atmospheric pressure, and the other bellows responsive to the pressure differential between the engine exhaust back pressure and a fixed pressure datum, the net expansion or contraction of the two bellows being used to control the position of the waste gate. With this construction, a substantially constant supercharger output pressure and therefore constant engine intake manifold pressure, may be automatically maintained independently of variations in the local atmospheric pressure, merely by properly proportioning the effective lengths of two bellows. Also, with this arrangement, since the variations in engine exhaust back pressure are very small, the turbo-supercharger regulator, by maintaining a substantially constant intake manifold pressure, thereby maintains a substantially constant engine power output for a given engine speed.

In an aircraft internal combustion engine installation equipped with an engine driven supercharger controlled by an intake throttle valve therefor, the problem of maintaining a substantially constant engine power independently of variations in the local atmospheric pressure is quite similar to that encountered in connection with a turbo-supercharger installation. Thus, if the throttle valve were controlled to maintain a constant engine manifold pressure, the engine power would increase with increasing altitude, because of the decreasing engine back pressure, whereas if the throttle valve were controlled to maintain a constant pressure differential between the engine intake manifold pressure and the local atmospheric pressure, the engine power would decrease with increasing altitude because of the decreasing intake manifold pressure. Therefore, the same regulator structure comprising two serially connected bellows may be used to control the throttle valve for maintaining a constant engine power, the one bellows being responsive to the difference between the engine intake manifold pressure and the local atmospheric pressure, and the other bellows being responsive to the difference between the engine intake manifold pressure and an absolute pressure datum.

Other objects of this invention will become apparent upon reading the annexed detailed description in connection with the drawing in which:

Figure 1 is a diagrammatic view of an internal combustion engine equipped with a turbo-supercharger and a turbo pressure regulator embodying the invention;

Figure 2 is a sectional view through the pressure regulator; and

Figure 3 is a diagrammatic view of an internal combustion engine equipped with an engine driven supercharger and a pressure regulator for controlling the supercharger intake throttle valve.

Referring first to Figures 1 and 2 of the drawing, an internal combustion engine 10 for aircraft is of the radial cylinder air-cooled type and discharges its exhaust gases into an exhaust manifold 12 and thence through exhaust conduit 14 to an annular nozzle box 16 from which the exhaust gases discharge against the buckets 18 of a turbine 20. The turbine 20 is drivably connected to the impeller of a supercharger 22 which supplies combustion air to a carburetor 24. From the carburetor 24 the combustion air may be fed directly to the various engine cylinders, or as illustrated, the combustion air is delivered to an engine driven supercharger 26 which further compresses the air into an annular manifold 28 from which it is delivered to the various engine cylinders through intake pipes 30.

In order to control the engine power output, a waste gate 32 is arranged to control the quantity of the exhaust gases delivered to the turbine 20 by by-passing a portion of these gases. A pressure regulator 34 is provided for automatically controlling the waste gate 32. The regulator 34 comprises a hydraulic servo-motor disposed within a housing 36 defining a cylinder 38 within which a piston 40 is slidable. The piston 40 carries a rod 42 to which the waste gate control rod 44 is pivotally attached. The housing 36 contains a valve drilling in which a valve 46 is slidable to admit oil under pressure from an inlet 48 to either the top or the bottom of the cylinder 38 through passages 52 or 54 respectively. The valve 46 also cooperates with an outlet passage 56 whereby, when the pressure inlet 48 is connected to the passage 52, the passage 54 is connected to the outlet 56 and vice versa. Accordingly, upon downward movement of the valve 46, from its neutral position illustrated in Figure 2, oil pressure is admitted to the bottom side of the piston 40 through passage 54 to effect outward movement of the piston rod 42, thereby providing a closing adjustment of the waste gate 32. Similarly, upon upward movement of the valve 46, from its said neutral position, oil pressure is admitted to the top of piston 40 to effect downward movement of the piston rod 42, thereby opening the waste gate 32.

Movement of the valve stem 46 is controlled by two elastic bellows 58 and 60 serially arranged on the valve stem, the bellows 60 being connected to a rod 62 which is controllable in its axial setting by a rack and pinion connection 64, the pinion position being controllable through a rod 66 from the aircraft cockpit. A chamber 68 in which the bellows 58 and 60 are disposed is connected through a pipe 70 to the exhaust conduit 14. The bellows 58 is evacuated and accordingly, moves in response to absolute pressure changes in the exhaust manifold. The bellows 60 contains air at atmospheric pressure, and thus controls the valve 46 in response to differential pressure between the exhaust pressure and local atmospheric pressure, since the bellows 60 is vented to atmosphere through a drilling 72 in the stem 62 and through a vent 74 in the regulator housing. With this construction, upon an increase in the engine exhaust pressure, the resulting compression of the two bellows results in upward movement of the valve 46 to effect opening adjustment of the waste gate 32, and similarly, a decrease in the engine exhaust back pressure results in a closing adjustment of the waste gate 32. Also, with this arrangement, the valve stem 46 is controlled in response to two pressure differentials, that is, the absolute pressure of the engine exhaust system and the difference in pressure between the exhaust system and the atmosphere. This affords altitude compensation for the waste gate control by which substantially constant supercharger delivery pressure is maintained. If the absolute pressure control alone were used, increase in altitude would tend to increase intake manifold pressure due to reduced back pressure on the turbine, whereas if the pressure differential between engine exhaust and atmospheric pressure alone were used, the manifold pressure would tend to decrease with increasing altitude. By serially arranging and properly proportioning the bellows 58 and 60 as shown, the resulting supercharger delivery pressure remains substantially constant regardless of power and altitude, within the capacity of the turbo-superchargers.

Movement of the lever 66 moves both bellows 58 and 60 to vary the exhaust back pressure to the value required to bring the valve 46 back to its neutral position. In this way the lever 66 provides for manual adjustment of the supercharger delivery pressure and engine power with an accompanying variation in the engine exhaust back pressure.

It will be noted that the chamber 68 containing exhaust manifold pressure is isolated from the cavity with which the vent 74 communicates and in addition, the valve stem 46 is balanced by a drilling 76, establishing communication between the chamber 68 and the bottom of the drilling in which the valve stem 46 is disposed. Valve stem movements, in a manner which is apparent, control admission of fluid to the servo cylinder 38 by which the position of the rod 42 is established and consequently the opening of the waste gate 32.

Referring now to Figure 3, a conventional internal combustion engine 80 for aircraft is provided with an engine driven supercharger 82 to which combustion air is delivered from the air scoop 84 and carburetor 86 under the control of a throttle valve 88. The supercharger compresses combustion air into an annular intake manifold 90 from which the combustion air is delivered to the various engine cylinders through intake pipes 92. The control for the throttle valve 88 comprises a regulator 34' having a piston rod 42' connected to the throttle valve 88. The regulator 34' in Figure 3 is identical to the regulator 34 of Figures 1 and 2, except the bellows chamber 68' is now subjected to engine intake manifold pressure through conduit 94. The parts of the regulator 34' in Figure 3 similar to corresponding parts of the regulator 34 have been designated by similar but primed reference numerals. With this construction, upon an increase in the engine intake manifold pressure, the two bellows 58' and 60' are compressed to effect upward movement of the valve 47' and therefore downward movement of the piston rod 42' thereby providing a closing adjustment of the throttle valve 88. Similarly, upon a decrease in the engine intake manifold pressure, the two bellows expand, thereby effecting an opening adjustment of the throttle valve 88. In this way, the throttle valve 88 is controlled in response to two serially connected pressure differentials. Thus the evacuated sealed bellows 58' is responsive to the absolute pressure of the engine intake manifold and the vented bellows 60' is responsive to the difference in pressure between the engine manifold pressure and the local atmospheric pressure. If the throttle valve 88 were controlled only by the bellows 58', the engine power would increase with increasing altitude, whereas if the throttle valve 88 is controlled only by a bellows 60', the engine power would decrease with increasing altitude. Therefore, by serially arranging and properly proportioning the length of bellows 58' and 60', the regulator 34' will control the engine throttle to maintain a substantially constant engine power for a given engine speed independently of variations in altitude.

Movement of the lever 66' moves both bellows 58 and 60' thereby varying the engine intake manifold pressure and engine power.

While I have described my invention in detail in its present preferred embodiment, it will be obvious to those skilled in the art, after understanding my invention, that various changes and modifications may be made therein without department from the spirit or scope thereof. I aim in the appended claims to cover all such modifications and changes.

I claim:

1. Control mechanism for use with a turbo-supercharger of an internal combustion engine having means for varying the speed of said turbo-supercharger and in which the turbine is driven by the engine exhaust and the supercharger delivers its output air to the engine induction system, said mechanism comprising a housing having a chamber adapted to be subjected to the pressure of the engine exhaust delivered to said turbine, a bellows assembly within said chamber comprising a pair of serially disposed bellows, one of said bellows being sealed and the other of said bellows being vented to atmospheric pressure, and means operatively connected to said bellows assembly for controlling said speed varying means.

2. Control mechanism for use with an internal combustion engine having a turbo-supercharger in which the turbine is driven by the engine exhaust and the supercharger delivers its output air to the engine induction system; and having means for varying the speed of said turbo-supercharger said mechanism comprising a housing having a chamber adapted to be subjected to the pressure of the engine exhaust delivered to said turbine; a first and a second bellows disposed within said chamber and externally subjected to said pressure, one of said bellows being sealed and the other of said bellows being vented to atmospheric pressure; means connecting one end of said first bellows with one end of said second bellows for simultaneous movement of said connected ends; means operatively connected to the other end of said first bellows for controlling said speed varying means; and means for anchoring the other end of said second bellows.

3. Control mechanism for use with an internal combustion engine having an element adjustable to regulate the power of said engine: said control mechanism comprising a housing having a chamber adapted to be subjected to a pressure variable with the power of said engine; a first and a second bellows disposed within said chamber and externally subjected to said pressure, one of said bellows being sealed and the other of said bellows being vented to atmospheric pressure; means connecting one end of said first bellows to one end of said second bellows for simultaneous movement of said connected ends; means operatively connected to the other end of said first bellows for controlling said pressure; and means for anchoring the other end of said second bellows.

4. Control mechanism for use with an internal combustion engine having an element adjustable to regulated the power of said engine: said mechanism comprising a housing having a chamber adapted to be subjected to a pressure which changes with changes in the power output of said engine so as to be indicative of said power output; a first and a second bellows disposed within said chamber and externally subjected to said pressure, one of said bellows being sealed and the other of said bellows being vented to atmospheric pressure; means connecting one end of said first bellows to one end of said second bellows for simultaneous movement of said connected ends; means operatively connected to the other end of said first bellows for controlling said pressure; and means for adjustably anchoring the other end of said second bellows.

5. In a regulator for a fluid pressure; a housing having a chamber subjected to said fluid pressure; a first bellows and a second bellows both disposed within said chamber and externally subjected to said fluid pressure; one of said bellows being sealed and the other of said bellows being vented at atmospheric pressure; means connecting one end of said first bellows with one end of said second bellows; means including a member operatively connected to the other end of said first bellows for controlling said fluid pressure; and means for adjustably anchoring the other end of said second bellows.

6. In a regulator for a fluid pressure; a housing having a chamber subjected to said fluid pressure; a first bellows and a second bellows both disposed within said chamber and externally subjected to said fluid pressure; one of said bellows being sealed and the other of said bellows being vented to atmospheric pressure; means connecting one end of said first bellows with one end of said second bellows; means including a member operatively connected to the other end of said first bellows for controlling said fluid pressure; and means for anchoring the other end of said second bellows.

7. In a regulator for a fluid pressure; a housing having a chamber subjected to said fluid pressure; a first bellows and a second bellows both disposed within said chamber and externally subjected to said pressure; one of said bellows being sealed and the other of said bellows being vented to atmospheric pressure; means connecting one end of said first bellows with one end of said second bellows for simultaneous movement of said connected ends; means including a member operatively connected to the other end of said first bellows for controlling said fluid pressure; means for anchoring the other end of said second bellows; and manually operable means for adjusting said fluid pressure control means.

8. Control mechanism for use with an internal combustion engine having a supercharger and means adjustable to regulate the supercharger output pressure: said control mechanism comprising a housing having a chamber adapted to be subjected to said pressure; a first and a second bellows disposed within said chamber and externally subjected to said pressure; one of said bellows being sealed and the other of said bellows being vented to the atmosphere; means connecting one end of said first bellows to one end of said second bellows for simultaneous movement of their connected ends; means operatively connected to the other end of said first bellows for controlling said pressure regulating means; and means for anchoring the other end of said second bellows.

9. Control mechanism for use with an internal combustion engine having an engine driven supercharger for the engine induction system and valve means adjustable to control the supercharger output pressure: said mechanism comprising a housing having a chamber adapted to be subjected to said pressure; a first and a second bellows disposed within said chamber and externally subjected to said pressure, one of said bellows being sealed and the other of said bellows being vented to the atmosphere; means connecting one end of said first bellows to one end of said second bellows for simultaneous movement of their connected ends; means operatively connected to the other end of said first bellows for controlling said valve means; and means for securing the other end of said second bellows.

10. Control mechanism comprising a housing having a chamber subjected to a variable pressure; a first bellows and a second bellows disposed within said chamber and externally subjected to said fluid pressure, one of said bellows being at least partially evacuated and sealed and the other of said bellows being vented to atmospheric pressure; means connecting one end of said first bellows with one end of said second bellows; a control member operatively connected to the other end of said first bellows; and means for anchoring the other end of said second bellows.

11. Control mechanism as recited in claim 10 in which said anchoring means is adjustable for shifting said bellows within said chamber.

KENNETH A. BROWNE.

REFERENCES CITED

The following references are of record in the file of this patent:

UNITED STATES PATENTS

| Number | Name | Date |
| --- | --- | --- |
| 1,310,683 | Sherbondy | July 22, 1919 |
| 1,346,563 | Sherbondy | July 13, 1920 |
| 1,557,793 | Berger et al. | Oct. 20, 1925 |
| 1,631,262 | Gourdou | June 7, 1927 |
| 2,216,699 | Berger | Oct. 1, 1940 |
| 2,283,175 | Berger | May 19, 1942 |
| 2,383,198 | Jorgensen | Aug. 21, 1945 |
| 2,403,398 | Reggio | July 2, 1946 |